United States Patent
Laporte

(10) Patent No.: US 9,776,254 B2
(45) Date of Patent: Oct. 3, 2017

(54) MACHINING PROCESS

(71) Applicant: MITIS, Bouguenais (FR)

(72) Inventor: Sylvain Laporte, Nantes (FR)

(73) Assignee: MITIS, Bouguenais (FR)

( * ) Notice: Subject to any disclaimer, the term of this patent is extended or adjusted under 35 U.S.C. 154(b) by 351 days.

(21) Appl. No.: 14/365,221

(22) PCT Filed: Dec. 11, 2012

(86) PCT No.: PCT/IB2012/057185
§ 371 (c)(1),
(2) Date: Jun. 13, 2014

(87) PCT Pub. No.: WO2013/088343
PCT Pub. Date: Jun. 20, 2013

(65) Prior Publication Data
US 2015/0003928 A1    Jan. 1, 2015

Related U.S. Application Data

(60) Provisional application No. 61/577,143, filed on Dec. 19, 2011.

(30) Foreign Application Priority Data

Dec. 16, 2011    (FR) ..................... 11 61857

(51) Int. Cl.
*B23B 41/16*    (2006.01)
*B23B 47/34*    (2006.01)
(Continued)

(52) U.S. Cl.
CPC ............. *B23B 41/16* (2013.01); *B23B 41/06* (2013.01); *B23B 47/00* (2013.01); *B23B 47/34* (2013.01);
(Continued)

(58) Field of Classification Search
CPC ......... B23B 35/00; B23B 37/00; B23B 41/06; B23B 41/16; B23B 47/34; B23B 2270/30; B23B 2270/54
See application file for complete search history.

(56) References Cited

U.S. PATENT DOCUMENTS 2,452,211 A * 10/1948 Rosenthal ............... B21B 11/00
125/30.02
3,003,372 A * 10/1961 Findley ................... B23B 47/34
408/17
(Continued)

FOREIGN PATENT DOCUMENTS

DE    10 2005 002 462 A1    7/2006
FR    914 700 A    10/1946
(Continued)

OTHER PUBLICATIONS

PCT/IB2012/057185 International Search Report and Written Opinion, mailed Feb. 27, 2013.
(Continued)

*Primary Examiner* — Eric A Gates

(74) *Attorney, Agent, or Firm* — Jones Robb, PLLC

(57) ABSTRACT

A machining method for at least one shaping machining operation can include carrying out a machining operation over a first distance using a cutting tool which is subjected to axial oscillations as it moves forward, then reducing the amplitude of the axial oscillations while continuing to drive the cutting tool in terms of rotation.

15 Claims, 7 Drawing Sheets

Figure 1:
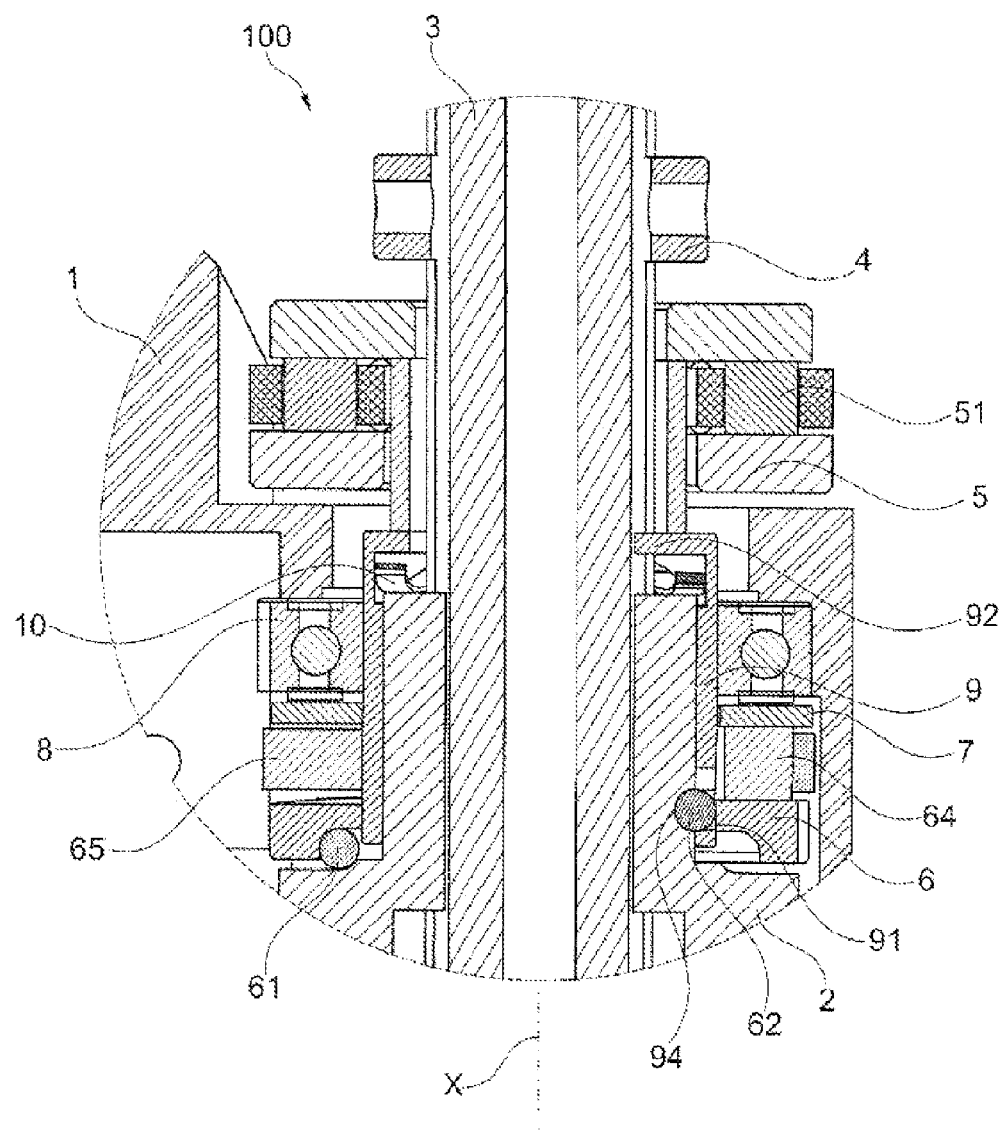

(51) Int. Cl.
*B23B 41/06* (2006.01)
*B23B 47/00* (2006.01)
*B23Q 5/32* (2006.01)
*B23Q 5/40* (2006.01)

(52) U.S. Cl.
CPC ............ *B23Q 5/326* (2013.01); *B23Q 5/402* (2013.01); *B23B 2250/16* (2013.01); *B23B 2260/02* (2013.01); *B23B 2270/30* (2013.01); *B23B 2270/54* (2013.01); *Y10T 408/03* (2015.01); *Y10T 408/23* (2015.01)

(56) References Cited

U.S. PATENT DOCUMENTS

| | | | | |
|---|---|---|---|---|
| 3,203,281 | A * | 8/1965 | Jones | B23B 25/02 408/17 |
| 5,113,728 | A * | 5/1992 | Medeksza | B23B 25/02 408/1 R |
| 5,143,493 | A * | 9/1992 | Najima | B23B 47/34 408/143 |
| 5,342,152 | A * | 8/1994 | Medeksza | B23B 25/02 408/1 R |
| 7,510,024 | B2 | 3/2009 | Veres | |
| 7,628,099 | B2 * | 12/2009 | Mann | B22F 9/04 148/308 |
| 7,692,360 | B2 * | 4/2010 | Liu | B06B 3/00 310/323.19 |
| 8,240,234 | B2 * | 8/2012 | Woody | B23B 1/00 82/1.11 |
| 8,257,002 | B2 * | 9/2012 | Prust | B23B 47/34 408/1 R |
| 2006/0099039 | A1 | 5/2006 | Maki | |
| 2007/0209813 | A1 | 9/2007 | Veres | |
| 2008/0310930 | A1 * | 12/2008 | Schaeffer | B23B 37/00 411/55 |
| 2009/0074525 | A1 | 3/2009 | Jaillon | |
| 2010/0003096 | A1 | 1/2010 | Peigne | |
| 2010/0296886 | A1 * | 11/2010 | Prust | B23B 47/34 408/1 R |
| 2012/0107062 | A1 | 5/2012 | Moraru | |
| 2013/0051946 | A1 | 2/2013 | Peigne | |

FOREIGN PATENT DOCUMENTS

| | | |
|---|---|---|
| FR | 2 902 848 A1 | 12/2007 |
| FR | 2 907 695 | 5/2008 |
| FR | 2 944 722 A1 | 10/2010 |
| FR | 2 952 563 | 5/2011 |
| JP | 2003-094276 A | 4/2003 |
| SU | 1197788 A * | 12/1985 |
| SU | 1247525 A1 * | 7/1986 |
| WO | WO 2008/000935 | 1/2008 |

OTHER PUBLICATIONS

French Search Report for French Application 1161857, mailed Mar. 19, 2012.

* cited by examiner

MACHINING PROCESS

This is a national stage application of PCT/IB2012/057185, filed internationally on Dec. 11, 2012, which claims priority to French Application No. FR 1161857, filed Dec. 16, 2011, and to U.S. Provisional Application No. 61/577,143, filed Dec. 19, 2011, the entire contents of each of which is incorporated by reference herein.

The present invention relates to methods and devices for machining.

Generally, machining is intended to create a shape by removing material using a cutting tool which is rotatably driven and moved relative to the material to be machined in accordance with the shape to be produced.

Using axial machining, there are two methods of creating the desired shape, that is to say, by means of shaping machining and envelope machining.

In the first instance, it is the shape of the cutting tool which determines the shape of the surface obtained. The surface obtained thus has a generatrix which is non-parallel with the rotation axis.

In the second instance, it is the envelope of the volume covered by the cutting tool which determines the shape of the surface machined.

Countersinking, spot-facing, conical bores and surface refinements are examples of axial shaping machining A through-hole is an example of axial envelope machining.

In particular in aeronautics, some axial machining operations must be carried out with precision. The machining operations in question are, for example:

countersinkings which are intended to receive the heads of the fixing elements, which must not protrude or which must be located in a recessed state so as not to create aerodynamic interferences (protrusion);

conical bores which are intended to receive assembly elements by means of cone/cone friction, for which the surface-area between the two elements must be correctly ensured;

the spot-facings and surface refinements which are intended to create planar abutment surfaces for assembly elements, such as nuts, rivet heads or screw heads and for which the quality of the abutment is essential for the durability of the assembly over time.

In these non-limiting examples, the machining carried out must thus ensure the dimensional and geometric compliance of the shapes produced.

Figure 7A:
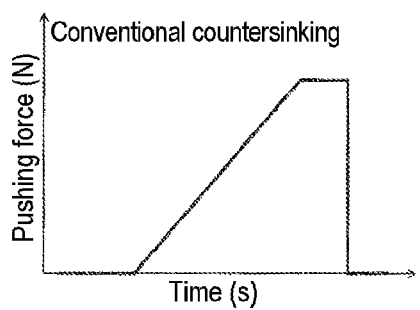

FIG. 7A illustrates the development of the force profile over time for a conventional countersinking. The increase of the force is a result of the fact that the deeper the countersinking (cone) is, the greater the amount of material intended to be removed for the same axial movement. The end of the operation sees the force remaining constant (or almost constant) since the tool stops moving forward in order to carry out a honing of the surface (smoothing), then the tool is disengaged and the force stops.

Vibration drilling devices are disclosed in the publications WO 2008/000935 A1, DE 10 2005 002 462 B4, U.S. Pat. No. 7,510,024 B2, FR 2 907 695, US 2007/209813 and FR 2 952 563.

Vibration drilling has been developed since it has in particular the advantage of facilitating the discharge of chips.

Figure 7B:
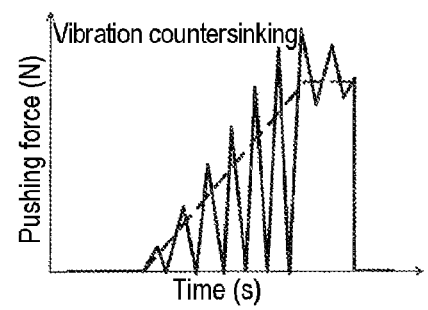

It can be seen in FIG. 7B, which illustrates the development of the force profile in the example of a countersinking, that the vibration component which even occurs in the honing phase is added to the initial force.

Up to the present time, the use of vibration drilling has remained confined to axial envelope machining, in particular for producing holes. This is because, in the case of axial shaping machining, the axial oscillations generate on the machined surface undulations which do not always allow the dimensional and geometric tolerances required to be ensured.

There is a need to further improve vibration-assisted machining devices, in particular in order to be able to carry out a shaping machining operation whilst having a surface which complies with the desired dimensional and geometric requirements at the end of the operation.

The invention thus relates to a machining method which involves at least one shaping machining operation, in particular an axial shaping machining operation, comprising:

a) carrying out a machining operation, in particular an axial machining operation, over a first distance using a cutting tool which is subjected to axial oscillations when it moves forward, then b) reducing the amplitude of the axial oscillations, this reduction preferably being elimination, whilst continuing to drive the cutting tool in terms of rotation. Step b) allows a machining operation of a precise form to be carried out.

Step b) may be followed by a step c) for releasing the cutting tool.

The method according to the invention allows a shaping machining operation to be carried out without the disadvantages connected with the presence of the undulations at the end of the forward movement of the cutting tool.

This method can be implemented on various installations for machining, and in particular not limited to vibration-assisted axial machining devices, comprising a vibration source as disclosed in FR 2 952 563.

The invention enables the production, during the machining operations, of operating conditions which ensure the position of the tool, which is of prime importance in shaping machining operations in which non-cylindrical shapes are desired, such as countersinking, conical drilling, spot-facing and surface refinement.

As a result of the invention, the vibration movement is deactivated or passivated, for example, on the final revolutions of the tool during the machining cycle, and the dimensional and shape tolerances at the end of the cycle are more readily complied with.

The amplitude of the axial oscillations may be reduced in different manners. The amplitude of the oscillations may be returned to zero or be reduced without being completely eliminated. In this instance, the amplitude is sufficiently reduced to obtain the surface state which is appropriate for the application for which the machining is carried out.

Figure 7D:
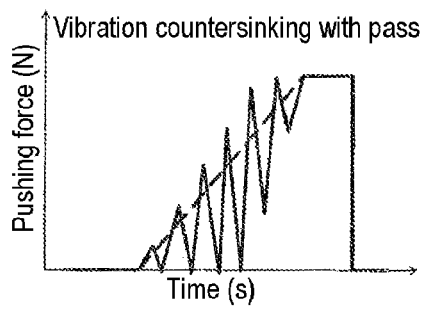
Figure 7C:
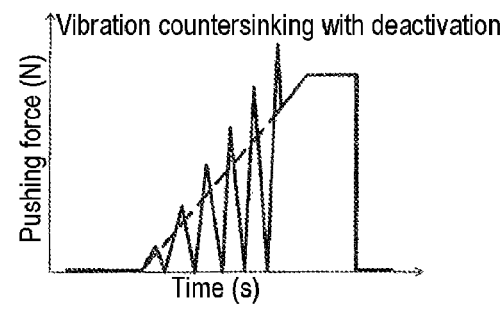

In order to reduce and preferably eliminate the amplitude of the oscillations, it is possible in a first approach to deactivate the vibration system, that is to say, to act on the source of the oscillations, in order, for example, to stop generating them or to generate them with a smaller amplitude. FIG. 7C illustrates this first approach in the context of the countersinking; it can be seen that the oscillations are interrupted at a given time at the end of the countersinking cycle which allows the honing phase to be retained without axial oscillations, as in conventional countersinking.

In a second approach, the amplitude of the axial oscillations is reduced, preferably cancelled, by passivating them, that is to say, by ensuring that the vibrations on the surface during machining are reduced, or almost zero, as a result of the absorption of the vibrations by a resilient damping member. FIG. 7D illustrates this second approach in the context of countersinking. It can be seen that the resilient damping member limits the maximum force and absorbs the undulations at the end of the cycle. A stabilized honing phase is achieved.

These two approaches may be combined where applicable.

The amplitude of the axial oscillations may advantageously be eliminated during step b), that is to say that the tool rotates without vibrating axially.

The tool may be subjected to a forward movement during step b). In a variant, the tool is not subjected to any forward movement during step b).

The method according to the invention may be implemented using various machining devices.

In an embodiment of the method, the axial machining is carried out using a machining device which has some characteristics of that described in the application FR 2 952 563, also called UPAM, in particular the mechanism for forward movement and release of the tool-carrying spindle and the manner of generating the axial oscillations, but other devices may be used.

The machining device used comprises, for example, a tool-carrying spindle, which rotates inside a frame, the frame accommodating a transmission system which brings about the automatic forward movement of the spindle relative to the frame under the action of the rotatable driving of the tool-carrying spindle, this transmission system comprising, for example, an advance pinion which is screwed to the spindle.

The device may comprise a rolling arrangement which comprises rolling members which rotate on an undulating rolling surface with an axial oscillation component in order to periodically urge the spindle in terms of movement.

More precisely, the rolling arrangement may comprise a smooth ring and an undulating ring between which the rolling members rotate. One of the rings, for example, the smooth ring, is fixed relative to a frame, whilst the other ring, for example, the undulating ring, may or may not be able to be moved relative to the frame. In order to make this other ring movable with respect to the frame, it is possible to use at least one connection member which is capable of assuming two positions, a coupling position in which it fixedly joins the ring to a drive pinion in terms of rotation, and the other position in which it decouples the ring and the drive pinion. This connection member is, for example, an abutment ball which, when it is blocked in a coupling position against the drive pinion and the ring, via a cam, causes the two to rotate together by means of a wedging effect. When the cam does not block the connection member, it allows the ring to remain free to move. The cam can preferably be moved axially along the axis of the spindle and moved at the end of a predefined path of the spindle in order to deactivate the vibration system. For example, the spindle comprises a stop which moves the cam by acting on it directly or indirectly. A resilient return member may be provided in order to return the cam to the initial position for blocking the connection member when the spindle is raised.

In a production variant which also uses a deactivation of the vibration system, it may also comprise two rings, one of which is smooth and the other undulating, and rolling members between the two. One of the rings, for example, the smooth ring, is either free to move relative to the frame and driven in terms of rotation with the drive pinion, or fixed relative to the frame, whilst the other ring, for example, the undulating ring, rotates with the drive pinion. In order to make the ring freely moving or fixed, a mechanism may act in order to move or not to move this ring away from an abutment surface which is fixed relative to the frame. In the remote position, the ring is free to move and, in the abutment position, it is fixed relative to the frame. The mechanism comprises, for example, at least a series of rolling members such as balls and a cam which radially displaces the rolling members to a greater or lesser extent against two inclined surfaces which generate an axial pushing force for moving away the ring and the abutment surface. The cam may be displaced axially, directly or indirectly, by a stop which is fixedly joined to the spindle. A resilient return member is advantageously provided in order to return the cam to the initial position thereof when the spindle is raised. This resilient return member is interposed, for example, between the drive pinion and the cam.

In an embodiment in which the vibration system is passivated, the device may comprise a sheath and a guide which rotates inside the sheath and which is connected by means of a sliding connection to a shaft which carries the tool. A vibration system is interposed axially between the sheath and the guide and transmits axial oscillations to the guide, therefore to the tool, when the guide rotates. The vibration system comprises, for example, two rings, in particular a smooth ring and an undulating ring which are moved at a rotation speed relative to each other, one of the rings, for example, the smooth ring, being completely connected to the sheath and the other ring, for example, the undulating ring, being, for example, in rotation with the guide, and urged axially into abutment against rolling members which extend between the two rings by means of a resilient damping member whose strength is sufficiently great that, during the axial machining operation, as long as the sheath is not blocked against the component to be machined, the vibration system may transmit vibrations to the shaft which carries the tool, the sheath being free to move axially but being immobilized in terms of rotation.

The device is arranged so that at the end of a specific forward movement, the sheath is blocked axially against the component to be machined. The guide may continue to move forward, therefore the tool can continue the machining operation; the axial oscillations are not transmitted to the tool since the sheath is blocked and are absorbed by the resilient damping member.

Generally, the steps b) for reducing, in particular eliminating, the amplitude of the axial oscillations and c) for releasing the cutting tool, may be offset in time for a period of time whose duration depends on various mechanical adjustments, which may be fixed or preferably variable. The advantage of making these adjustments variable is that it may be necessary to change the duration of the delay in accordance with the forward movement per revolution of the tool-carrying spindle and the amplitude of the oscillations.

The tool may be used to carry out a spot-facing, a surface refinement, a countersinking or a conical bore.

The invention also relates to a device for axial machining which allows the method according to the invention to be implemented as defined above and which may comprise at least one of the features above.

Figures 1A, 1B:
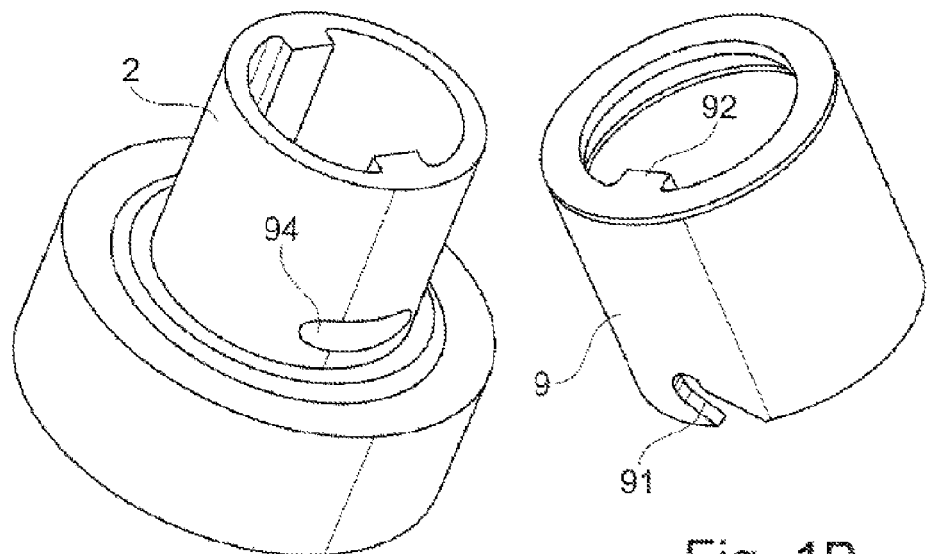
Figures 1C, 1D:
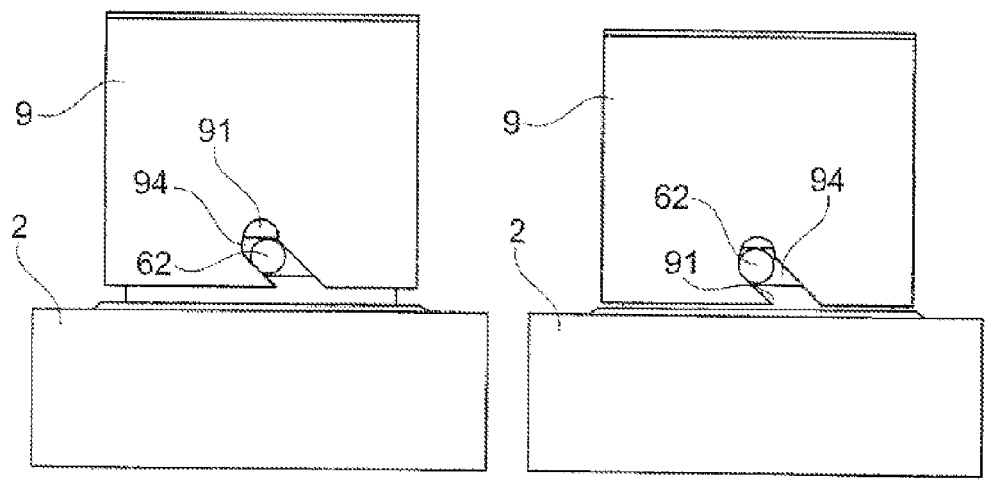
Figure 2:
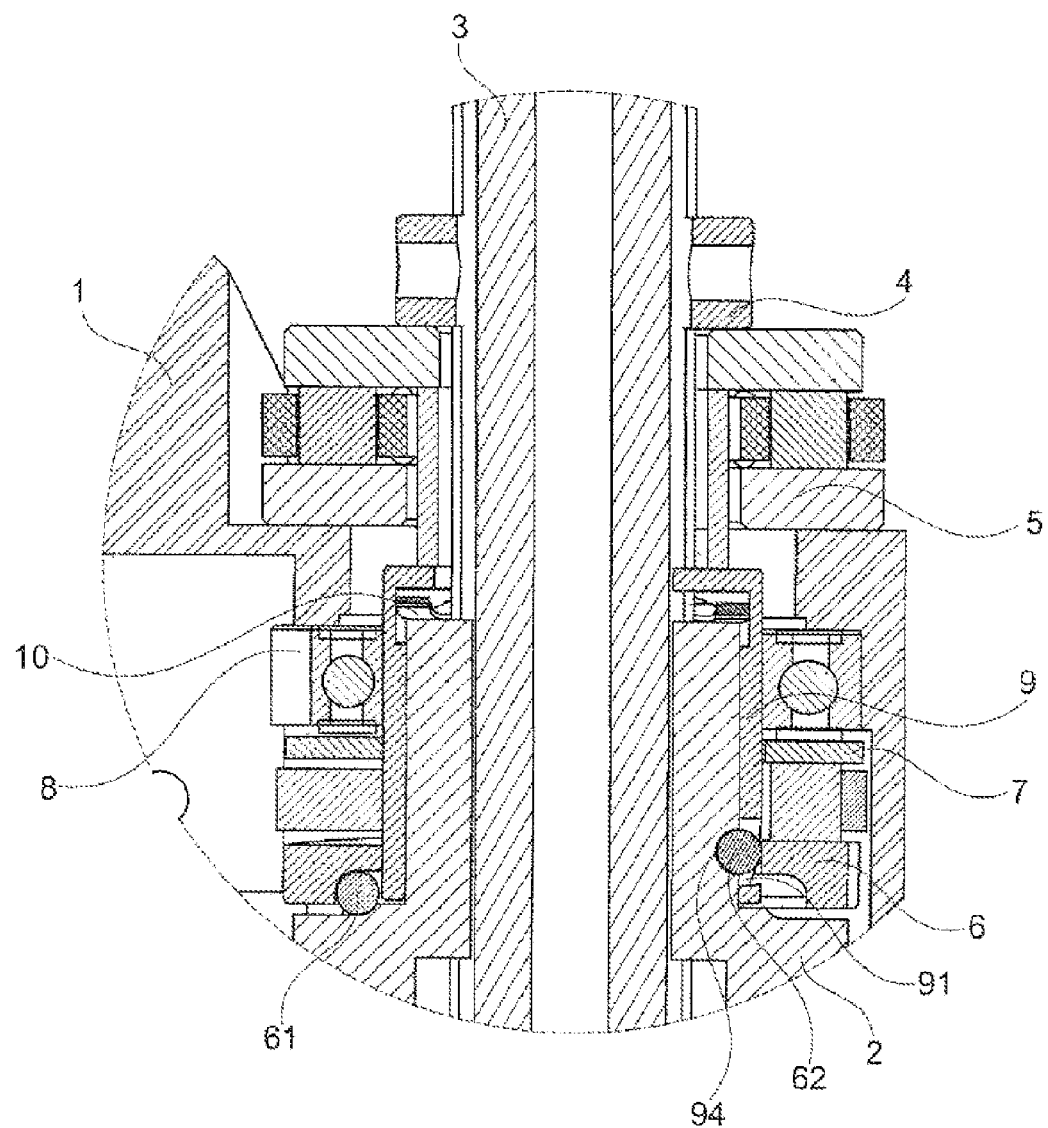
Figure 3:
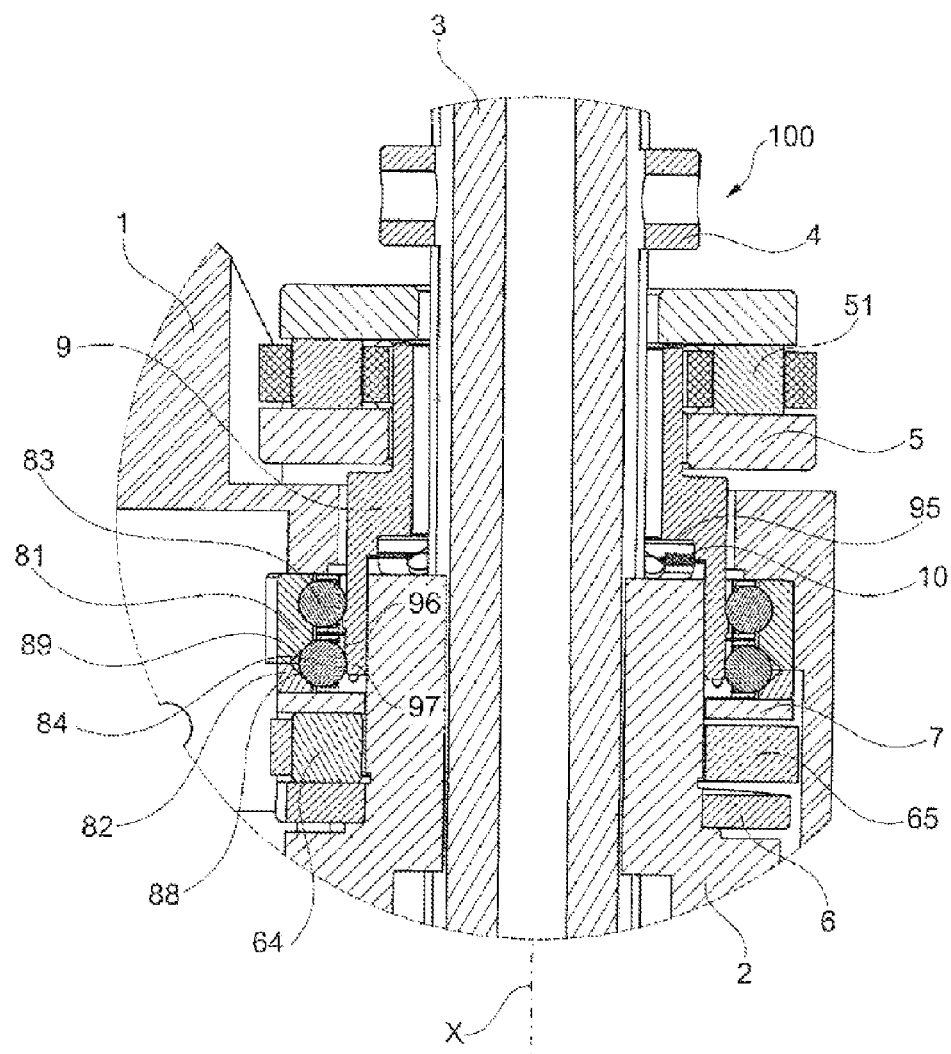
Figure 4:
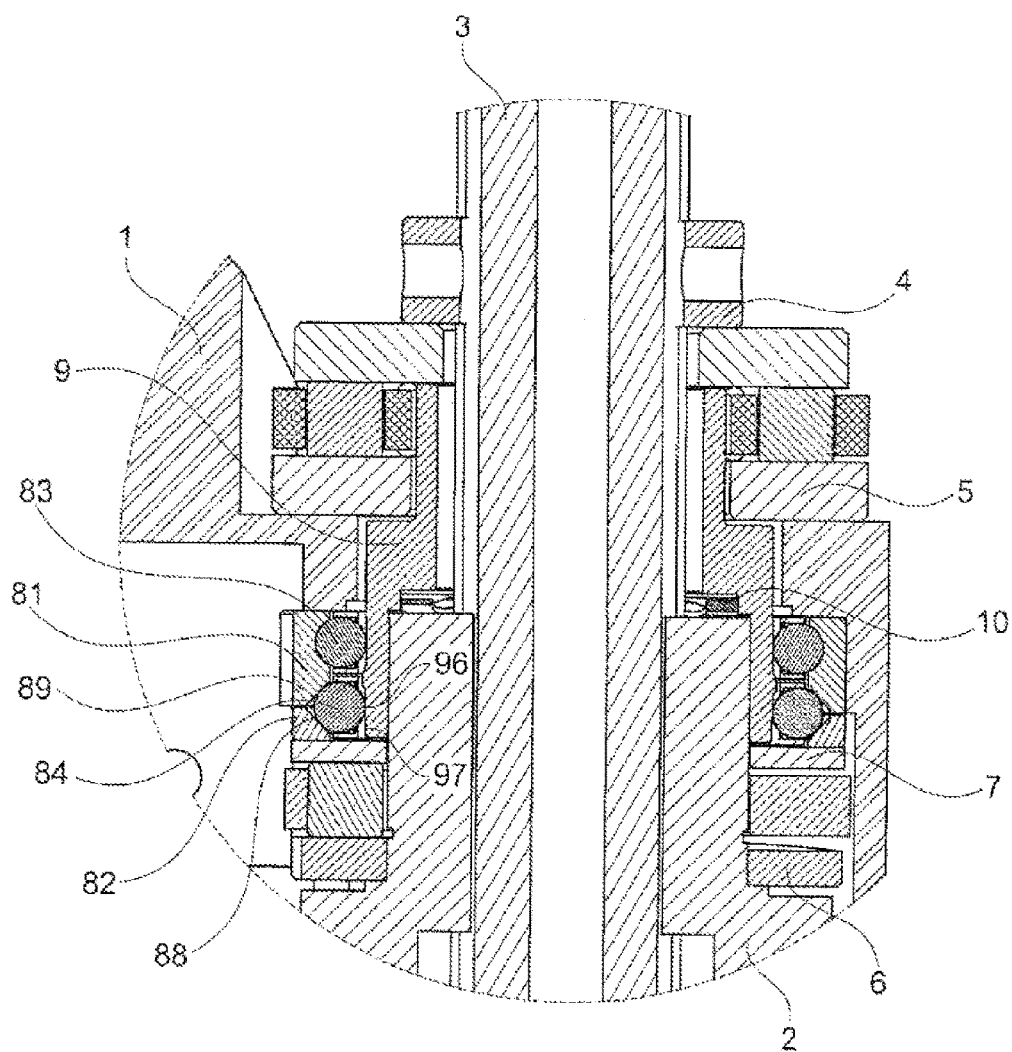
Figures 5, 6:
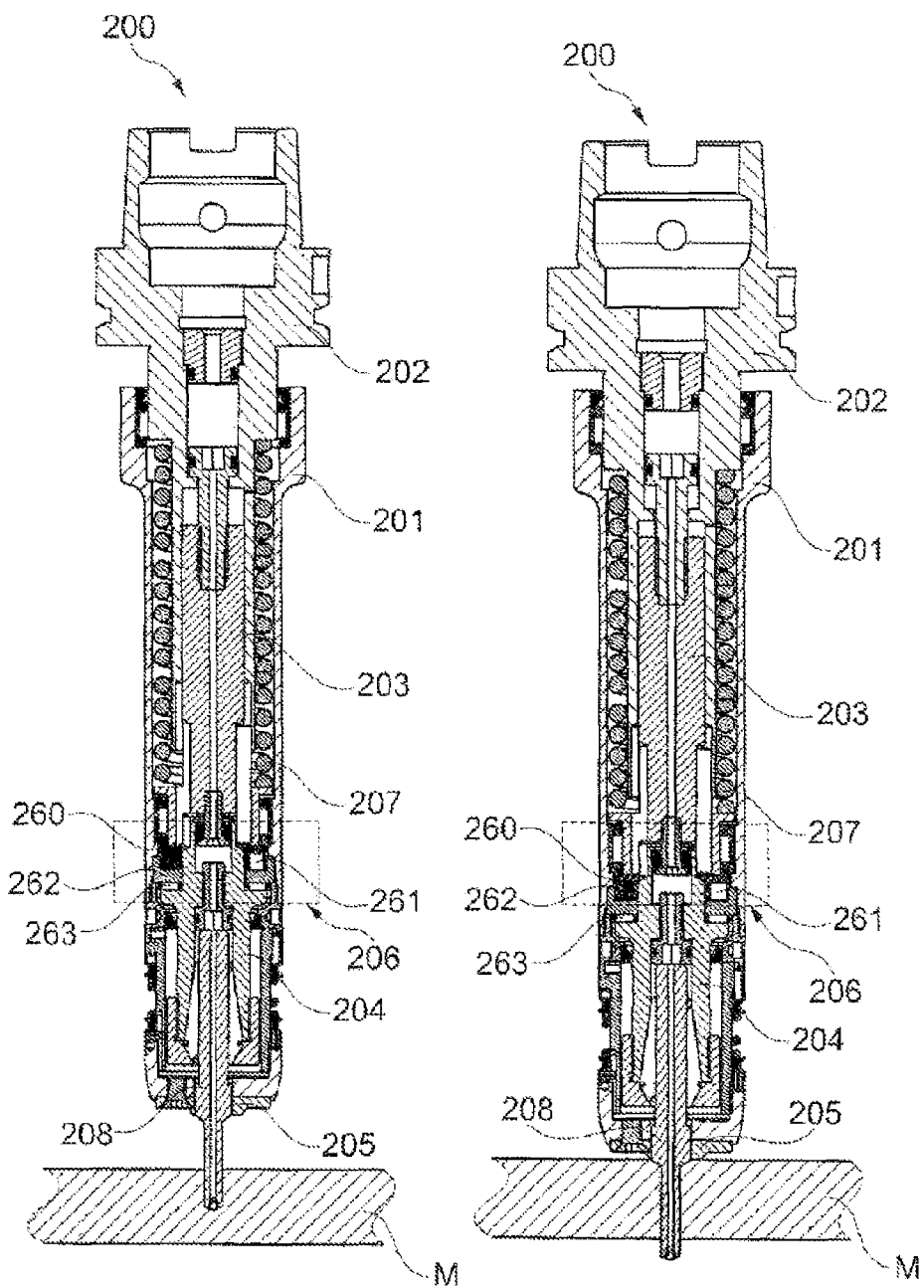

The invention will be able to be better understood on reading the following detailed description of non-limiting embodiments thereof, and on examination of the appended drawings, in which:

FIG. 1 is a partial and schematic axial section of an example of a device for implementing the invention (in its variant with deactivation of the vibrations), in a configuration for vibration-assisted machining, FIGS. 1A and 1B show the drive pinion and the cam, respectively, FIGS. 1C and 1D are elevational views of the cam, the abutment ball and the drive pinion, respectively, for upper and lower positions of the cam, respectively, FIG. 2 shows the device of FIG. 1 in the configuration for deactivating vibrations, FIG. 3 is a view similar to FIG. 1 of a production variant of the device (in the variant thereof with deactivation of the vibrations), in the configuration for vibration-assisted machining, FIG. 4 shows the device of FIG. 3 in the configuration for deactivation of vibrations, FIG. 5 is a partial and schematic axial section of an example of a device for implementing the invention (in its variant with the vibrations passivated), in the configuration for vibration-assisted machining, FIG. 6 shows the device of FIG. 5 in the configuration with the vibrations passivated, and FIGS. 7A to 7D, described above, illustrate the force profile as a function of time for various countersinking methods.

There will now be described examples of devices for implementing the invention, with reference to FIGS. 1 to 4, in which the vibrations are deactivated in the above-mentioned step b) of the method. These devices are, for example, automatic drilling units (UPA) which are provided with an integrated vibration system.

The following description relates mainly to the means which ensure the disengagement, the means which ensure the forward movement and the generation of axial oscillations being known per se, for example, from FR 2 952 563.

The machining device 100 illustrated in FIGS. 1 and 2 comprises a spindle 3 which is slidingly connected to a drive pinion 2, illustrated alone in a schematic and partial manner in FIG. 1A, which drives it in rotation about an axis X in a manner known per se.

The spindle 3 is in helical connection with an advance pinion (not illustrated) which drives it in translation.

The combination of these two movements brings about the cutting speed and the advance speed of the tool (not illustrated) which is connected to the spindle 3.

The drive pinion 2 is pivotably connected in a sliding manner to a frame 1 by means of a guiding rolling arrangement 8.

The vibration system for generating axial oscillations is constituted in this example by an undulating ring 6, a smooth ring 7 and rolling members, such as rollers 64, which are held in position using a cage 65.

The relative speed between the undulating ring 6 and the smooth ring 7 generates oscillations, as described in the application FR 2 952 563.

The undulating ring 6 is pivotably connected to the drive pinion 2 by means of rolling members 61, such as balls.

The smooth ring 7 is fixed to the frame 1.

A cam 9 which is illustrated alone in FIG. 1B is slidingly connected to the spindle 3 by means of a stud 92 which is engaged in an axial groove of the spindle 3.

The cam 9 comprises an aperture 91 which is substantially helical, and the drive pinion 2 comprises an axial groove 94 which has an axis which is perpendicular relative to the rotation axis and which has a circular cross-section.

A connection member such as an abutment ball 62 is engaged in the aperture 91 and in the groove 94 of the drive pinion 2; the width of the aperture 91 and the groove 94 of the drive pinion 2 correspond substantially to the diameter of the ball 62 which is thus in annular linear connection with respect to the pinion 2 and the cam 9.

In the upper position of the cam 9, as illustrated in FIG. 1C, the ball 62 is forced by the cam 9 and the groove 94 to be pressed against the undulating ring 6.

A movable stop 5 which is constituted, for example, by a roller type stop 51, as illustrated, is pivotably connected to the cam 9 in a sliding manner.

A fixed stop 4 is fixed to the spindle 3, for example, in an adjustable manner.

A resilient return member 10 tends to move the cam 9 away from the drive pinion 2, for example, being interposed as illustrated between a defined shoulder below the stud 92 of the cam 9 and the upper end of the pinion 2.

Operating Phase A/

During this operating phase, the resilient return member 10 retains the cam 9 in an upper position, as illustrated in FIG. 1.

In this upper position, the cam 9, by means of combination of the profiles of the groove 94 and the aperture 91, places the abutment ball 62 in a coupling position, illustrated in FIG. 1C, where it fixedly joins the undulating ring 6 and the drive pinion 2 by means of an abutment effect.

The complete connection between the drive pinion 2 and the undulating ring 6 constituted in this manner allows the rotation speed about the axis X of the drive pinion 2 to be transmitted to the undulating ring 6.

The relative speed of the undulating ring 6 with the smooth ring 7 of the vibration system generates axial oscillations along the axis X.

These axial oscillations are transmitted to the spindle 3 via the drive pinion 2 then the advance pinion (not illustrated).

In this phase, the axial machining is therefore subjected to axial oscillations which are superimposed on a constant forward movement of the spindle 3.

Operating Phase B/

At the end of the axial machining travel, the fixed stop 4 which is fixedly joined to the spindle 3 will first cause the movable stop 5 to move in translation along the axis X.

The movement of the movable stop 5 is accompanied by the translation of the cam 9 which moves the abutment ball 62 into a disengagement position, illustrated in FIG. 1D, which releases the undulating ring 6. This ring is no longer fixedly joined in terms of rotation to the drive pinion 2 and becomes free to move.

The internal friction of the vibration system leads to the undulating ring 6 stopping in terms of rotation. The undulating ring 6 and the smooth ring 7 no longer have any relative speed.

The generation of the axial oscillations is deactivated, the spindle 3 nonetheless being able to continue to advance.

During the phase b), the axial machining is subjected only to the constant forward movement of the spindle 3. It becomes a conventional axial machining operation until it stops at the end of travel.

Phase C/

At the end of the axial machining travel, the fixed stop 4 which is fixedly joined to the spindle 3 places the movable stop 5 in contact with the frame 1, as illustrated in FIG. 2.

The contact between the movable stop 5 and the frame 1 stops the spindle 3 in terms of translation.

The blocking of the spindle 3 in terms of translation brings about the release movement.

On moving back, the spindle 3 and the fixed stop 4 release the movable stop 5.

The release of the movable stop 5 returns the system to the starting position as a result of the resilient return member 10.

A production variant of the device 100 will now be described with reference to FIGS. 3 and 4. In these Figures, the reference numerals are retained for the constituent elements which are identical or similar to those previously described with reference to FIGS. 1 and 2.

As in the example above, the spindle 3 is slidingly connected to the drive pinion 2 which drives it in rotation, and the spindle 3 is connected in a helical manner to the advance pinion (not illustrated) which drives it in terms of translation.

The combination of these two movements generates cutting and advance speeds of the tool (not illustrated) which is connected to the spindle 3, respectively.

The drive pinion 2 is slidingly connected in a pivoting manner to the frame 1 by means of a guiding rolling arrangement which comprises a ring 81 and rolling members 83, such as balls.

The vibration system for generating axial oscillations is constituted in the example considered by an undulating ring 6, a smooth ring 7 and rolling members which are fixed in position using a cage 65, in this instance rollers 64 as in the above example.

The relative speed between the undulating ring 6 and the smooth ring 7 generates axial oscillations.

The undulating ring 6 is fixed relative to the drive pinion 2 and rotates therewith.

The smooth ring 7 is pivotably connected to the frame 1 by means of rolling members 84, such as balls, and an external ring 82 which has an oblique face 88.

The cam 9 is slidingly connected to the spindle 3 and constitutes an internal ring for the rolling members 83 and 84.

The movable stop 5 is constituted in the example illustrated by a roller type stop 51 which is slidingly connected to the cam 9 along the axis.

The resilient return member 10 tends to move the cam 9 away from the drive pinion 2 by interposing itself axially between a shoulder 95 of the cam 9 and the drive pinion 2.

The rolling members 83 rotate between the cam 9 which constitutes an internal ring for them and an external ring 81 which has an oblique face 89 which is arranged substantially at a right angle relative to the oblique face 88 of the external ring 82.

Operating Phase A/

The resilient return member 10 retains the cam 9 in an upper position.

The cam 9 has a lower portion 97 whose internal ring diameter for the rolling members 84 allows contact to be ensured between the external rings 81 and 82, as illustrated in FIG. 3.

This contact between the external rings 81 and 82 causes the smooth ring 7 to become fixedly joined to the frame 1.

The complete connection between the frame 1 and the smooth ring 7 constituted in this manner allows the smooth ring 7 to be stopped in terms of rotation.

The relative speed of the undulating ring 6 relative to the smooth ring 7 allows axial oscillations to be generated, which are transmitted to the spindle 3 via the drive pinion 2 then the advance pinion (not illustrated).

During this phase, the axial machining is therefore subjected to axial oscillations which are superimposed on the constant forward movement of the spindle 3.

Operating Phase B/

At the end of the axial machining travel, the fixed stop 4 which is fixedly joined to the spindle 3 first causes the movable stop 5 to move in translation which displaces the cam 9 downward in the Figures.

The translation of the cam 9 causes the rolling members 84 to roll on an upper portion 96 of the cam 9, whose diameter is greater than that of the lower portion 97.

The radial movement of the rolling members 84 against the oblique faces 88 and 89 causes the external rings 81 and 82 to become decoupled in terms of rotation. The smooth ring 7 is no longer fixedly joined to the frame 1 and becomes free to move.

The internal friction of the vibration system allows the smooth ring 7 to be rotatably driven.

The undulating ring 6 and the smooth ring 7 no longer have any relative speed.

The generation of the axial oscillations is deactivated, the spindle 3 continuing to move forward. During this phase, the axial machining is therefore subjected only to the constant forward movement of the spindle 3. It becomes a conventional axial machining operation, until it stops at the end of travel.

Phase C/

At the end of the axial machining travel, the fixed stop 4 which is fixedly joined to the spindle 3 places the movable stop 5 in contact with the frame 1 which stops the spindle 3 in terms of translation and will bring about the release movement.

On moving back, the spindle 3 and the fixed stop 4 release the movable stop 5, which returns the system to the starting position as a result of the resilient return member 10.

A production variant in which the axial oscillations are passivated will now be described with reference to FIGS. 5 and 6.

The device 200 illustrated in these Figures is integrated in a tool carrier for a numerically controlled machine and is intended to carry out drilling/countersinking operations during the same cycle.

The device 200 comprises a fitting 202 which is completely connected to the spindle of the machine and a guide 203 which is slidingly connected to the fitting 202.

A resilient damping member 207 allows a preload to be generated on the guide 203, which preload is orientated in the forward movement direction and is greater than the pushing forces of the tool 208 during the drilling/countersinking operation.

A shaft 204 is slidingly connected to the guide 203.

The device 200 comprises a vibration system 206 which comprises an undulating ring 260, rolling members 261, a fixed smooth ring 262 and a needle type stop 263, which allows axial oscillations to be generated between the guide 203 and the shaft 204 when there is a relative rotation movement between the undulating ring 260 and the smooth ring 262.

The tool 208 can be completely connected to the shaft 204 in a manner which can be disassembled.

The device 200 also comprises a sheath 201 which is pivotably connected to the fitting 202 in a sliding manner.

The sheath 201 is kept fixed in terms of rotation (by means which are not illustrated) on the frame of the machine (not illustrated), but can move axially.

The smooth ring 262 is completely connected to the sheath 201. This sheath 201 is provided at the distal end thereof with a stop component such as a tripod 205 which is completely connected to the sheath 201 in an adjustable manner; the axial position thereof is adjusted so that the front face of the tripod 205 corresponds to the axial position of the tool 208 at the end of the countersinking operation.

Operating Phase A/

The rotation of the spindle brings about the rotation of the fitting 202 and, consecutively, of the guide 203, the shaft 204 and the tool 208.

The relative rotation speed between the undulating ring 260 and the fixed ring 262 brings about an axial oscillation which is transmitted to the guide 204 and the tool 208.

The forward movement of the spindle moves in an integral manner all of the constituent components of the device 200 in translation.

In a state associated with the cutting movement (rotation), the forward movement of the spindle (constant) and the axial oscillations generated by the vibration system 206 bring about a combined movement which is capable of complying with the axial machining in the material M to be drilled/countersunk.

Operating Phase B/

At the end of the axial machining cycle, the material M comes into contact with the tripod 205.

Since the tripod 205 is completely connected to the smooth ring 262 by means of the sheath 201, the contact with the material M stops the shaft 204 and the tool 208 in terms of translation.

The oscillations generated by the vibration system 206 are integrally retransmitted to the resilient damping member 207 and the constant forward movement of the spindle.

The tool 208 therefore continues to rotate without advancing. The few rotation revolutions of the tool 208 in the material M allow the surface to be "honed", that is to say, allow a surface to be obtained which is in accordance with the axial shaping machining (countersinking) at the end of the cycle.

Phase C/

The numerically controlled machine is programmed in order to carry out a slight overtravel which is absorbed by the resilient damping member 207; then to return to the rear to a release position.

Moving back, the release of the contact between the material M and the tripod 205 allows the resilient damping member 207 to return the device 200 into the original configuration thereof.

Of course, the invention is not limited to the examples illustrated.

For example, the vibration system can be produced in a manner other than with rotating rolling members between a smooth ring and an undulating ring.

In this manner, in a variant which is not illustrated, the rolling members rotate between two undulating surfaces whose offset can be adjusted, as described in the publication WO 2008/000935; the offset is controlled in accordance with the forward movement in order to deactivate the vibration system at the end of a predefined forward movement.

In other variants, the vibration system is electromechanical, pneumatic, hydraulic, piezoelectric or the like.

Although the invention is preferably used for axial shaping machining, the invention may advantageously be used for turning.

The expression "comprising a" must be understood to be synonymous with "comprising at least one".

The invention claimed is:

1. A machining method for at least one shaping machining operation, the method comprising:
carrying out a machining operation over a first distance using a cutting tool which is subjected to axial oscillations as it moves forward, wherein the axial oscillations are obtained using a vibration system comprising a smooth ring and an undulating ring, then
reducing the amplitude of the axial oscillations, while continuing to drive the cutting tool in terms of rotation, wherein reducing of the amplitude of the oscillations occurs via passivation of the vibration system, the passivation being obtained by a resilient damping member which absorbs all or part of vibration forces.

2. The method as claimed in claim 1, wherein reducing the amplitude of the axial oscillations includes reducing the amplitude to about zero.

3. The method as claimed in claim 1, further comprising subjecting the tool to a forward movement during the reducing of the amplitude.

4. The method as claimed in claim 1, wherein the reducing occurs without subjecting the tool to forward movement.

5. The method as claimed in claim 1, wherein the vibration system, during the passivation, is disposed at one side directly or indirectly in axial abutment against the material to be machined and urging at the other side the resilient damping member.

6. The method as claimed in claim 1, wherein the tool is configured to carry out an axial shaping machining operation chosen from a countersinking, a spot-facing, a surface refinement or a conical bore.

7. A device for implementing a machining method as defined in claim 1, the device comprising:
a cutting tool support,
a vibration system configured to subject the cutting tool to axial oscillations,
a mechanism configured to automatically enable the amplitude of the oscillations to be reduced at the end of a predefined movement of the cutting tool.

8. A device as claimed in claim 7, further comprising a tool-carrying spindle rotatable inside a frame, the frame accommodating a transmission system configured to cause automatic forward movement of the spindle relative to the frame under the action of the rotation of the tool-carrying spindle.

9. The device as claimed in claim 8, the vibration system comprising a rolling arrangement which comprises rolling members configured to rotate on an undulating rolling surface with an axial undulation component to periodically urge the tool in terms of movement.

10. The device as claimed in claim 9, the rolling arrangement comprising a smooth ring and an undulating ring, between which the rolling members are configured to rotate, at least one of the rings being fixed relative to the frame, the device comprising a connection member configured to assume two positions including a coupling position in which it fixedly joins the undulating ring to a drive pinion, and another position in which it decouples the ring and the drive pinion, the connection member being an abutment ball which, when it is blocked in a coupling position against the drive pinion and the undulating ring, via a cam, causes the undulating ring and the drive pinion to rotate together by a wedging effect and, when the cam does not block the connection member the undulating ring is free to move, the cam being configured to move axially along the axis of the spindle and moved at the end of a predefined path of the spindle in order to deactivate the vibration system, the spindle comprising a stop which moves the cam by acting on it directly or indirectly, a resilient return member being provided in order to return the cam to the initial position for blocking the connection member when the spindle is raised.

11. The device as claimed in claim 9, the rolling arrangement comprising a smooth ring and an undulating ring, between which the rolling members rotate, one of the rings being either free to move relative to a frame and driven in terms of rotation with a drive pinion, or fixed relative to the frame, and the other ring being rotatable with the drive pinion, a mechanism being disposed and configured to move or not to move this ring away from an abutment surface which is fixed relative to the frame so that, in the remote position, the ring is free to move and, in the abutment position, the ring is fixed relative to the frame, the mechanism comprising a series of rolling members such as balls and a cam which radially displaces the series of rolling members to a greater or lesser extent against two inclined surfaces which generate an axial pushing force for moving away the ring and the abutment surface, the cam being displaced axially, directly or indirectly, by a stop which is fixedly joined to the spindle, a resilient return member being disposed and configured to return the cam to the initial position thereof when the spindle is raised, this resilient return member being interposed between the drive pinion and the cam.

12. The device as claimed in claim 9, further comprising a sheath and a guide configured to rotate inside the sheath and connected by sliding connection to a shaft which carries the tool, the vibration system being interposed axially between the sheath and the guide and transmitting axial oscillations to the guide and to the tool when the guide rotates, the vibration system comprising two rings a smooth ring and an undulating ring, the rings being moved at a rotation speed relative to each other, one of the rings being completely connected to the sheath and the other ring being in rotation with the guide and urged axially into abutment against rolling members which extend between the rings via a resilient damping member, the damping member having a strength sufficient for, during the axial machining operation and as long as the sheath is not blocked against the component to be machined, the vibration system to transmit axial oscillations to the shaft which carries the tool, the sheath being free to move axially but being immobilized in terms of rotation, the device being arranged so that, at the end of a specific forward movement, the sheath is blocked axially against the component to be machined, the guide being able to continue to move forward, the axial oscillations not being transmitted to the tool and being absorbed by the resilient damping member.

13. A machining method for at least one shaping machining operation, the method comprising:
carrying out a machining operation over a first distance using a cutting tool which is subjected to axial oscillations as it moves forward, then
reducing the amplitude of the axial oscillations, while continuing to drive the cutting tool in terms of rotation,
wherein the reducing of the amplitude of the axial oscillations results from an action on a vibration system at an origin of the oscillations and the axial oscillations are obtained by rolling between two rolling surfaces, at least one of which is an undulating surface, the surfaces having, during the production of the oscillations, different rotation speeds, and wherein the reducing of the amplitude is obtained by reducing the relative rotation speed between the surfaces.

14. The method as claimed in claim 13, further comprising acting on a cam at the end of a predefined forward movement of the tool, the cam having an axial movement and being arranged so as to act on a connection between a ring, defining a rolling surface for rolling members, and a frame or a rotating portion, wherein the modification of the connection resulting from the movement of the cam leads to a modification of the relative speed between the rolling surfaces.

15. A machining method for at least one shaping machining operation, the method comprising:
carrying out a machining operation over a first distance using a cutting tool which is subjected to axial oscillations as it moves forward, then
reducing the amplitude of the axial oscillations, while continuing to drive the cutting tool in terms of rotation,
wherein the reducing of the amplitude of the axial oscillations results from an action on a vibration system at an origin of the oscillations and the axial oscillations are obtained by rolling between two rolling surfaces, at least one of which is an undulating surface, the surfaces having, during the production of the oscillations, different rotation speeds, and wherein the reducing of the amplitude is obtained by causing the two surfaces to rotate at the same speed or by immobilizing the two surfaces.

* * * * *